Patented Apr. 3, 1934

1,953,419

UNITED STATES PATENT OFFICE 1,953,419

METHOD OF PRODUCING FERTILIZERS

Walter Hoge MacIntire, Knoxville, Tenn.

No Drawing. Application March 28, 1932,
Serial No. 601,717

5 Claims. (Cl. 71—9)

This invention relates to fertilizers and more particularly to the treating of acid phosphate and other and more concentrated phosphatic fertilizers to improve the mechanical condition of such materials and to supplement their plant-food value.

It has heretofore been proposed to treat acid phosphates with a neutralizing agent such as calcium oxide or calcium carbonate or limestone, that tends to change their chemical reaction from acid to alkaline and produce a better mechanical mixture.

One of the objects of the present invention is to improve phosphate fertilizers by treating such fertilizers to diminish their acidity and produce a dry, fine mixture together with the addition of magnesium in a concentrated and available form of plant food for preventing diseases and nutritional inadequacies such as are typified by sand drown.

Another object of the present invention is to provide a method of producing a dry, acid-free phosphate fertilizer having concentrated and available forms of calcium and magnesium plant foods.

Another object of the present invention is to provide a dry, acid-free, highly available phosphate fertilizer containing inexpensive basic material in quantities sufficient to transform the acid properties of the superphosphate and to furnish additional basic material to neutralize soil acidity; to include magnesium and calcium plant foods that are most quickly "available" after being incorporated with the soil and one that will undergo little chemical change during storage or shipment and consequently will exert no deleterious effects on containers.

Another object of the present invention is the use of selectively calcined dolomite as a cheap, concentrated and available form of magnesium and calcium for neutralizing, drying, and adding mineral supplements to acid phosphates, ammoniated superphosphates and other manurial forms of phosphates such as treble superphosphate and mono- or di-ammonium phosphates or potassium phosphate.

Another object of the present invention is the use of the most concentrated alkaline form of magnesium and a form that will not effect a liberation of the ammonia content of ammoniated phosphatic fertilizers and their mixes.

Still another object is to provide a method which will afford increased economies by reason of its utilization of magnesium-oxide-calcium-carbonate, as a concentrated derivative of either dolomitic or high-magnesic materials in a fertilizer at places remote from the occurrence of such materials.

These and other objects will become apparent from the following description of the invention.

The method of the present invention is particularly adapted for use with those fertilizers known as superphosphates which lack magnesium and hence require the separate addition of magnesium to the soil as a mineral supplement. These superphosphates because of their free phosphoric acid and acid phosphate salts are supposed to cause soil to become acid or more acid and to attack containers during storage and shipment, besides being in a poor mechanical condition for handling. The present invention secures the addition and mixture of magnesium oxide and calcium carbonate in an inexpensive form with acid fertilizers, such as superphosphates, to neutralize the free acid and change the hydroscopic water to chemical water of crystallization and water chemically bound with magnesium oxide to form magnesium hydroxide. The resulting product will then be a fine, dry, acid-free material that is inactive toward containers during shipment and has a readily available quantity of magnesium as a plant food. The term "available" as used in the specification defines that characteristic of the material which allows the same to be readily assimilated by the plant, and is used in conformity with the use of the term as employed in the official methods of determining the availability of phosphoric acid in fertilizers. The method although particularly adapted for use with those acid fertilizers known as superphosphates, is also applicable with those fertilizers that contain phosphoric acid in combination singly or jointly, with calcium, potassium, or ammonium, in either of the three possible forms of primary, secondary, or tertiary salt.

By way of example, when high grade superphosphates are mixed with magnesium oxide and calcium carbonate the magnesium oxide will preferentially react with the free phosphoric acid and form mono-magnesium phosphate, then di-magnesium phosphate, and possibly even tri-magnesium phosphate, depending upon proportions of the mix, all three forms analyzing completely "available". For each di-magnesium phosphate molecule thus produced a considerable amount of hydroscopic water is transformed into chemical water of crystallization, the amount of water transformed being six times as great as would be the case if calcium were used in place of magnesium. The drying of the material i further induced by the hydration of that quantity of the magnesium oxide that does not combine with the free phosphoric acid and mono-calcium phosphate, to form magnesium hydroxide, which takes up surplus water and produces a fine, dry product. Because of the preferential reaction of the magnesium oxide with the free acid and water present, any deleterious reaction between the calcium carbonate and acid phosphate that would change their soluble characteristics is minimized or prevented, leaving the calcium carbonate largely in its original condition. The magnesium will then be present in the material in the three readily available forms of magnesium phosphates, magnesium hydroxide and magnesium oxide in its original condition. Since the reactions are completed rapidly large quantities of the phosphate fertilizer may be treated quickly and economically without storage or rehandling.

The method of the present invention resides in the use of a modified dolomite, selectively calcined, as a supply of calcium and magnesium. The natural dolomite is first partially and selectively calcined at a temperature of 670 to 700° C. for such periods of time as may be determined specifically for a particular dolomite and until major quantities of calcium carbonate and magnesium oxide are present in a soft and readily disintegratable form with a minimum of calcium oxide. This selectively calcined dolomite including major quantities of magnesium oxide and calcium carbonate together with a small percentage (.5%) of calcium oxide as a concomitant product is mixed with the acid fertilizer, such as superphosphate, in such quantities that all of the free phosphoric acid will be neutralized and a large part of the hydroscopic water transformed to produce a dry material. Further, magnesium is used in an amount in excess of that required to neutralize the acid of the superphosphate, such excess amounting to approximately 2% by weight of the finished product which is considered essential to the requirement of an acceptable fertilizer especially for tobacco crops. The term dolomite as used herein is intended to include all equivalent materials including rocks containing on the order of 30% or more of magnesium carbonate and frequently referred to in common parlance as dolomite.

The final product produced by the method above described will be acid-free and in such a dry mechanical condition as to preclude any appreciable further chemical reaction so that it may be stored or shipped in containers without attacking the same. This dry condition of the product in a finely divided form facilitates the easy handling and distribution of the same in the soil. After being introduced into the soil any unreacted excess of the alkaline selectively calcined material will neutralize the acidity of the soil, or at least prevent the making of the soil more acid and tend to prevent the phosphate from uniting chemically with iron and aluminum compounds in the soil which assures a greater availability of the phosphate to the soil for a longer period of time. Further, the fertilizing material when introduced into the aqueous system of the soil supplies magnesium as a plant food in three concentrated and available forms of magnesium phosphate, carbonate, and bicarbonate, since the magnesium hydroxide and magnesium oxide that are insoluble and inactive in the dry mix are readily transformed into soluble magnesium carbonate through reaction with the carbon dioxide of the soil. Because of the preferential reaction of the magnesium with phosphoric acid the calcium carbonate will remain in its original condition constituting a concentrated and available form of calcium which will be readily assimilated as a food by the plant.

It will be readily apparent that an inexpensive method has been provided for improving fertilizers by so treating acid fertilizers that a dry, finely divided product results which includes the mineral supplements of calcium and magnesium in a concentrated and available form and which has a minimum of chemical reaction during storage or shipment but which after incorporation into the soil chemically reacts to neutralize an acid condition and prevent an undesirable chemical union of the phosphates with iron and aluminum.

It will be apparent that the exceedingly low solubility of the magnesium oxide and its drying effect through conversion of the oxide to the hydroxide permits the use of the concentrated selectively calcined dolomite with phosphates that have been ammoniated by either chemical impregnation or mechanical admixtures of the several ammoniates without determinable losses of ammonia. Further, other materials may be added to those described for use with particular soils without departing from the spirit of the invention. It is therefore to be understood that the term superphosphates as used in the appended claims is intended to include any fertilizer or fertilizer mixtures in which phosphoric acid is the dominant fertilizer component.

What is claimed is:

1. The method of producing a dry highly available fertilizer having a minimum chemical reaction until introduced into the aqueous system of the soil and which comprises the mixing with acid phosphates dolomite calcined until major quantities of calcium carbonate and magnesium oxide are present with but a small percentage of calcium oxide.

2. A phosphate fertilizer including a mixture of acid phosphate and dolomite or equivalent magnesic limestone calcined until major quantities of calcium carbonate and magnesium oxide are present with but a small percentage of calcium oxide.

3. The method of producing a dry acid-free fertilizer which consists in calcining dolomite until major quantities of calcium carbonate and magnesium oxide are present with but a minimum of calcium oxide and mixing such calcined dolomite with superphosphates, whereby the acid of the superphosphates is neutralized and hydroscopic water is changed to chemical water of crystallization.

4. The method of producing a dry acid-free fertilizer which consists in calcining dolomite until major quantities of calcium carbonate and magnesium oxide are present with but a small per cent of calcium oxide, and mixing such calcined dolomite with superphosphate in such proportions as to afford an excess of magnesium oxide over that required to neutralize the acid of the superphosphate.

5. The method of producing a dry acid-free fertilizer which consists in calcining dolomite until major quantities of calcium carbonate and magnesium oxide are present with but a small per cent of calcium oxide, and mixing such calcined dolomite with superphosphates in such proportions as to afford sufficient magnesium oxide to neutralize the acid of the superphosphates, whereby substantially all of the calcium carbonate is left chemically unchanged.

WALTER HOGE MacINTIRE.